A. LOEB.
FOOD PRESERVING CHEST.
APPLICATION FILED JAN. 7, 1911.

1,041,120.

Patented Oct. 15, 1912.

WITNESSES:
Cecil Long
OD Martin

INVENTOR
Adam Loeb
BY
ATTORNEY

UNITED STATES PATENT OFFICE.

ADAM LOEB, OF PORTLAND, OREGON.

FOOD-PRESERVING CHEST.

1,041,120.  Specification of Letters Patent.  Patented Oct. 15, 1912.

Application filed January 7, 1911. Serial No. 601,492.

*To all whom it may concern:*

Be it known that I, ADAM LOEB, a citizen of the United States, and a resident of Portland, county of Multnomah, and State of Oregon, have invented a new and useful Improvement in Food-Preserving Chests, of which the following is a specification.

My invention has for its object to provide a chest in which food may be preserved without the aid of ice. I have discovered that when food is inclosed in a chest, the air in which is saturated with evaporations from the salt, it may be kept for a long period without spoiling. Taking advantage of this discovery, I have built, and successfully used, the chest made as illustrated in the accompanying drawings and hereinafter described.

Figure 1:
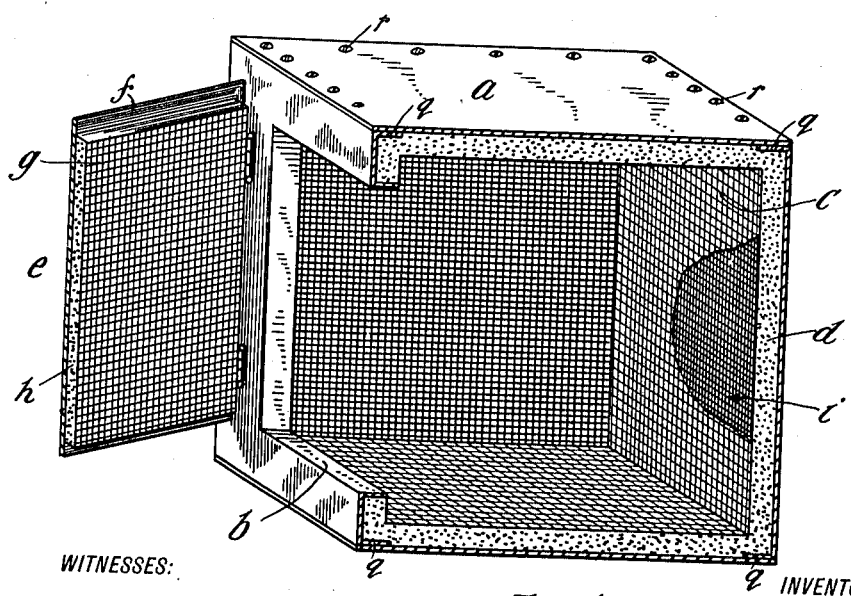

In the drawings: Figure 1 is a sectional perspective of my invention, that is to say, the near wall and a part of the door being shown as cut away so as to disclose the interior construction; and Fig. 2 shows substantially the same as Fig. 1, except in this case, for the purpose of obtaining a greater evaporating surface for the salt, I have built the interior shell of my chest in corrugated form instead of on straight lines, as shown in Fig. 1.

Referring in the first instance to Fig. 1: The outer walls or shell of the box, $a$, may be constructed of metal or wood, as convenient. The chest is provided with a door frame, $b$, and is made with an inner shell, $c$, comprising sides, top and bottom, which inner shell is spaced approximately three or four inches from the outer shell of the chest, so as to leave an intermediate space, $d$, in which is packed crushed salt. The door, $e$, is substantially of the same construction, comprising an outer wall $f$ and an inner shell $g$, between which is a filling of salt $h$. The inner shell, $c$, of the chest and the shell, $g$, of the door are conveniently made of galvanized wire screen or wire cloth, on the inner surface of which is fastened a lining of cheese cloth, $i$, so as to hold the crushed salt in place, at the same time permitting for the free evaporation of the salt into the interior of the chest, thus saturating the air there confined with salty vapors, and in so doing bringing about the condition which renders my chest a food preserving device.

Figure 2:
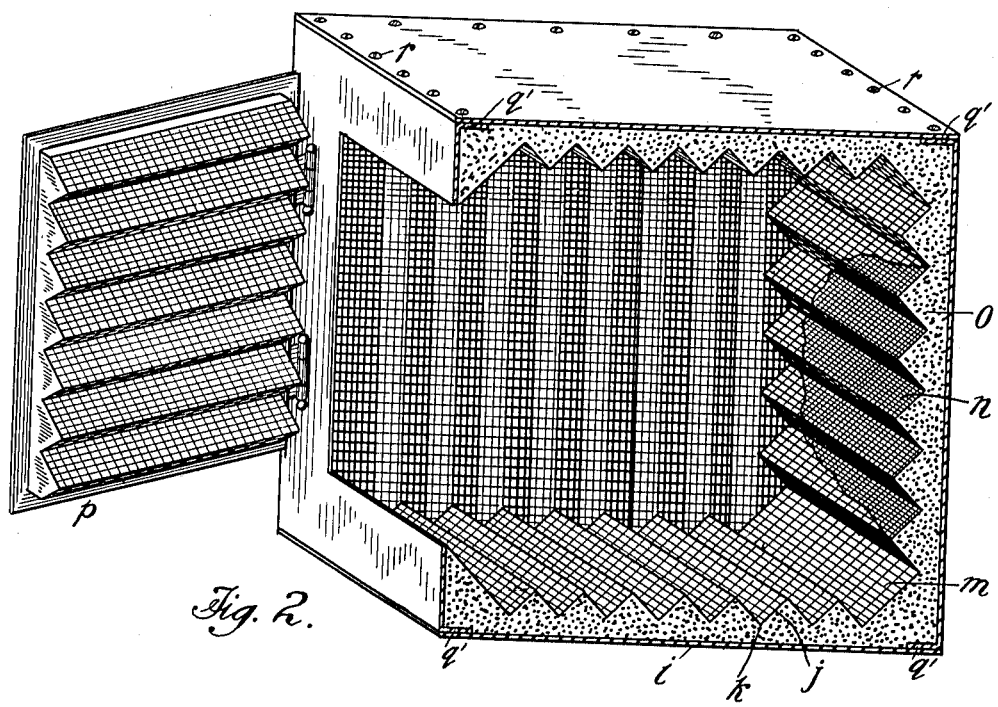

As already mentioned in describing Fig. 2, the construction therein shown differs only from that shown in Fig. 1, in this: Instead of making the inner shell on straight line surfaces, I prefer to build it with corrugated surfaces, as shown at $j$, the innermost point, $k$, of which is spaced approximately three or four inches from the outer shell $l$. The inner shell, shown in this instance, is also composed of galvanized wire cloth or screen $m$, lined by cheese cloth $n$, the space being filled by crushed salt $o$. The door $p$ is built substantially in the same manner. In this construction I expose a greater salt area at the interior of the chest, relatively to its size, than would be obtained by straight surfaces; and such greater surface is, of course, desirable since it facilitates the end in view. Of course I do not confine myself to any particular material with which to build the shell, the only limitation being that the material from which said inner shell is built must have sufficient rigidity, be protected against rusting and must be perforated to permit the evaporations from the salt to enter into the interior of the chest. In the interior of the chest may be provided shelves (not shown) arranged as convenient, and as common in other chests for the preservation of food; and in practice it is convenient to place a pan in the bottom of the chest, preferably a wooden pan, for catching food droppings, so as to keep the bottom clean. The interior of my chest is to be cleaned with a dry cloth, by merely rubbing over the surface; water must under no circumstances be used; and the door must fit fairly air-tight, and must be kept closed.

In my own tests with my food preserving chest I have successfully kept butter and meats for more than thirty days; I have kept milk for over fifteen days, and found that bread would keep quite fresh for a week or more. My chest is also well adapted for preserving vegetables.

In order to make the building of my chest convenient, and especially so with respect to inserting the inner shell and salt filling, the top of the outer shell may be removable, the side walls being provided with flanges as shown at *q* in Fig. 1 and *q'* in Fig. 2, and the top piece fastened thereon by screws *r*.

I claim:

A food preserving chest comprising an outer shell, and an inner shell made of open mesh material spaced apart from the outer shell, and an intermediate filling of salt, the walls of said inner shell being formed to represent corrugated surfaces whereby the area of the surfaces is increased and the action of the salt filling is facilitated.

ADAM LOEB.

Witnesses:
 CECIL LONG,
 O. O. MARTIN.